(12) United States Patent
Kulagowski et al.

(10) Patent No.: US 12,519,802 B2
(45) Date of Patent: Jan. 6, 2026

(54) HORIZONTAL SCALING OF VIRTUAL NETWORK SECURITY FUNCTIONS

(71) Applicant: Corsa Security, Ottawa (CA)

(72) Inventors: Adam Kulagowski, Warsaw (PL); David Whittaker, Ottawa (CA)

(73) Assignee: Corsa Security, Ottawa (CA)

( * ) Notice: Subject to any disclaimer, the term of this patent is extended or adjusted under 35 U.S.C. 154(b) by 336 days.

(21) Appl. No.: 18/209,373

(22) Filed: Jun. 13, 2023

(65) Prior Publication Data
US 2023/0412614 A1 Dec. 21, 2023

Related U.S. Application Data

(60) Provisional application No. 63/353,360, filed on Jun. 17, 2022.

(51) Int. Cl.
*H04L 9/40* (2022.01)

(52) U.S. Cl.
CPC .................... *H04L 63/123* (2013.01)

(58) Field of Classification Search
CPC .............................. H04L 63/123; H04L 63/20
See application file for complete search history.

(56) References Cited

U.S. PATENT DOCUMENTS

| | | | | |
|---|---|---|---|---|
| 8,200,827 B1* | 6/2012 | Hunyady | ............ | H04L 65/1045 709/227 |
| 8,352,999 B1* | 1/2013 | Zhan | ..................... | H04L 63/083 713/193 |
| 8,848,528 B1* | 9/2014 | Fanjoy | ................ | H04L 63/1408 370/231 |
| 9,021,547 B1* | 4/2015 | Lin | ......................... | H04L 63/20 726/1 |
| 2011/0219035 A1* | 9/2011 | Korsunsky | ............ | H04L 63/102 707/E17.005 |
| 2014/0068698 A1* | 3/2014 | Burchfield | .............. | H04L 63/20 726/1 |
| 2020/0084141 A1* | 3/2020 | Bengough | ........... | H04L 47/2483 |
| 2020/0099658 A1* | 3/2020 | Couillard | ................. | G09C 1/00 |

FOREIGN PATENT DOCUMENTS

WO   WO-2018218353 A1 * 12/2018 ............. G06F 15/00

* cited by examiner

*Primary Examiner* — Javier O Guzman
(74) *Attorney, Agent, or Firm* — Rahman LLC

(57) ABSTRACT

Handling packet flows in a communications network includes receiving a first packet that is part of a first unidirectional packet flow; determining whether the first packet is from a packet flow that has been assigned to any one of a plurality of security application instances; processing the first packet by one of the plurality of security application instances; determining whether a first flow identifier for the processed first packet is in a first flow database; recording the first flow identifier for the processed first packet in the first flow database upon determining that the first flow identifier for the processed first packet is not in the first flow database; and recording in a second flow database (i) a second flow identifier for a return packet flow of the first unidirectional packet flow, and (ii) a first security application instance identifier that processed the first packet.

22 Claims, 6 Drawing Sheets

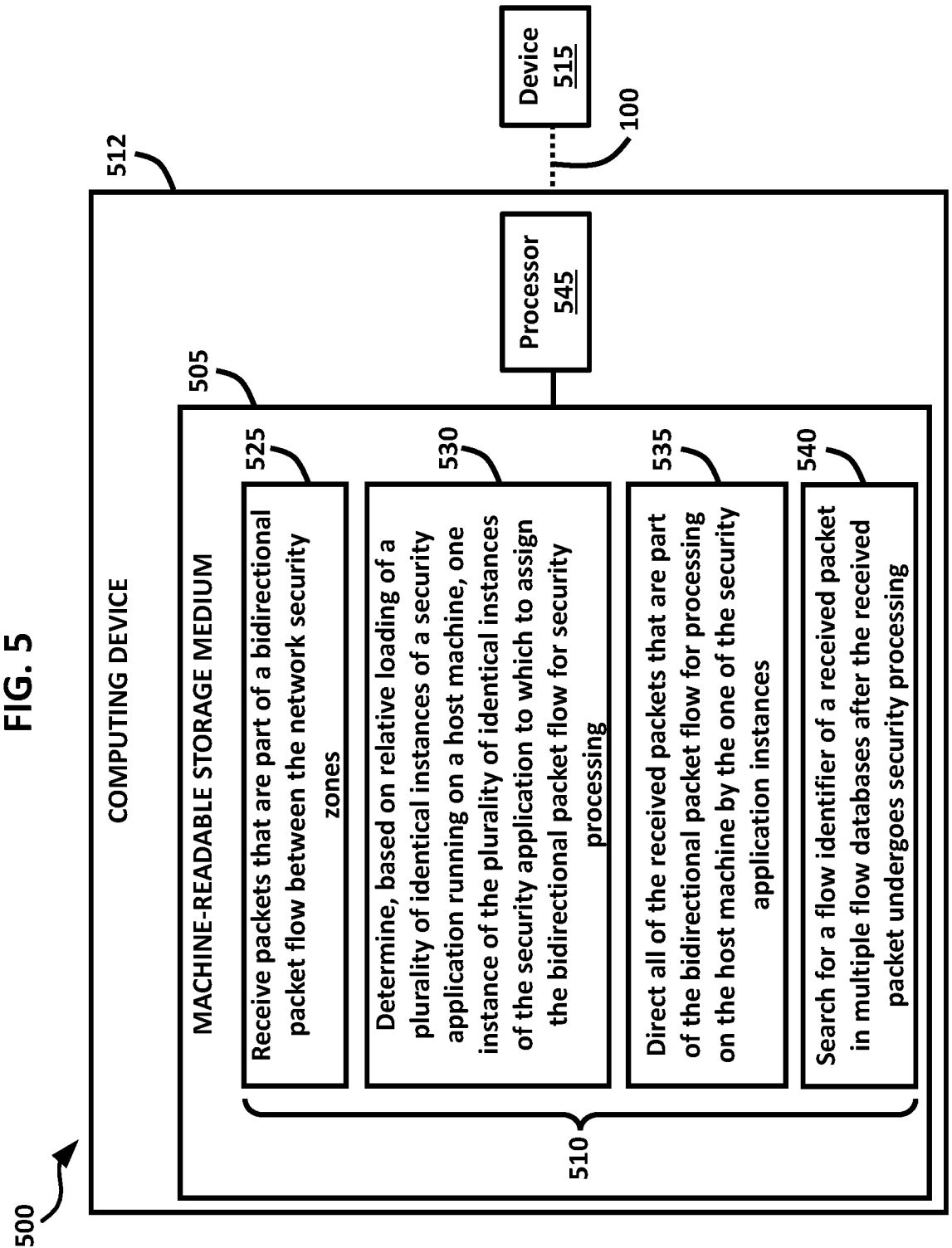

HORIZONTAL SCALING OF VIRTUAL NETWORK SECURITY FUNCTIONS

CROSS-REFERENCE TO RELATED APPLICATIONS

This application claims benefit to U.S. Provisional Patent Application Ser. No. 63/353,360, filed Jun. 17, 2022 and entitled "METHODS AND APPARATUS FOR HORIZONTAL SCALING OF VIRTUAL NETWORK SECURITY FUNCTIONS," which is hereby incorporated by reference in its entirety.

BACKGROUND

Field of the Invention

The embodiments herein generally relate to the field of communications networks and more specifically to the handling of data packets to enhance the security of communications networks and scale network security infrastructure with traffic volume.

Background of the Invention

Network security systems provide security functions to communications networks. These functions could include, for example, firewalling, in which a barrier to malicious traffic between a trusted network such as a private corporate network and another untrusted network, such as the Internet, for example, is provided. Network security functions could also or instead include monitoring and logging of network traffic, intrusion detection, intrusion prevention, and/or decryption of encrypted traffic for enhanced visibility. Malicious attacks on communications networks are growing in sophistication and size. Therefore, scalable network security functions could beneficially improve network security.

SUMMARY

In view of the foregoing, an embodiment herein provides a method for handling packet flows between a first network security zone and a second network security zone in a communications network, the method comprising receiving, at a first logical side of a security control point in the communications network, a first packet that is part of a first unidirectional packet flow from the first network security zone to the second network security zone; determining whether the first packet is from a packet flow that has been assigned to any one of a plurality of security application instances; processing the first packet by one of the plurality of security application instances; determining whether a first flow identifier for the processed first packet is in a first flow database; recording the first flow identifier for the processed first packet in the first flow database upon determining that the first flow identifier for the processed first packet is not in the first flow database; and recording in a second flow database (i) a second flow identifier for a return packet flow of the first unidirectional packet flow, and (ii) a first security application instance identifier of the security application instance that processed the first packet.

The method may further comprise forwarding the first packet to an assigned security application instance upon determining that the first unidirectional packet flow has been assigned for processing to one of the plurality of security application instances, or upon recording of a security application instance identifier for the security application instance to which the first unidirectional packet flow is assigned for processing in a third flow database. The method may further comprise discharging the first packet from a second logical side of the security control point in the communications network upon determining that the flow identifier of the first packet is in the first flow database. The following steps may be disabled for a predetermined type of security application: the determining whether a first flow identifier for the processed first packet is in a first flow database; the recording the first flow identifier for the processed first packet in the first flow database upon determining that the first flow identifier for the processed first packet is not in the first flow database; and the recording in a second flow database (i) a second flow identifier for a return packet flow of the first unidirectional packet flow, and (ii) a first security application instance identifier of the security application instance that processed the first packet.

In an embodiment, the predetermined type of security application does not change the IP source and/or destination addresses of the first packet. The following steps may only be performed for a predetermined range of IP source and/or IP destination addresses of the first packet: the determining whether a first flow identifier for the processed first packet is in a first flow database; the recording the first flow identifier for the processed first packet in the first flow database upon determining that the first flow identifier for the processed first packet is not in the first flow database; and the recording in a second flow database (i) a second flow identifier for a return packet flow of the first unidirectional packet flow, and (ii) a first security application instance identifier of the security application instance that processed the first packet.

The method may further comprise receiving, at a second logical side of the security control point in the communications network, a second packet that is part of a second unidirectional packet flow from the second network security zone to the first network security zone; determining whether the second packet is from a packet flow that has been assigned to any one of the plurality of security application instances; processing the second packet by one of the plurality of security application instances; determining whether a third flow identifier for the processed second packet is in a fourth flow database; recording the third flow identifier for the processed second packet in the fourth flow database upon determining that the third flow identifier for the processed second packet is not in the fourth flow database; and recording in the third flow database (i) a fourth flow identifier for a return packet flow of the second unidirectional packet flow, and (ii) a second security application instance identifier that processed the second packet.

The method may further comprise forwarding the second packet to an assigned security application instance upon determining that the second unidirectional packet flow has been assigned for processing to one of the plurality of security application instances, or upon recording of a security application instance identifier for the security application instance to which the second unidirectional packet flow is assigned for processing in the third flow database. The method may further comprise discharging the second packet from the first logical side of the security control point in the communications network upon determining that the flow identifier of the second packet is in the fourth flow database. The method may further comprise running the plurality of security application instances on a combination of a first host machine and a second host machine, wherein the first host machine and the second host machine are remotely located from each other. The first host machine may comprise a first load balancer and the second host machine may comprise a second load balancer, wherein the first load balancer is to (i) assign the first packet to one of the security application instances running on the second host machine, and (ii) forward the first packet to the second load balancer, and wherein the second load balancer is to forward the first packet to the one of the security application instances running on the second host machine.

Another embodiment provides a machine-readable storage medium comprising computer-executable instructions that when executed cause a processor of a computing device to receive, at a first logical side of a security control point in the communications network, a first packet that is part of a first unidirectional packet flow from the first network security zone to the second network security zone; determine whether the first packet is from a packet flow that has been assigned to any one of a plurality of security application instances; process the first packet by one of the plurality of security application instances; determine whether a first flow identifier for the processed first packet is in a first flow database; record the first flow identifier for the processed first packet in the first flow database upon determining that the first flow identifier for the processed first packet is not in the first flow database; and record in a second flow database (i) a second flow identifier for a return packet flow of the first unidirectional packet flow, and (ii) a first security application instance identifier of the security application instance that processed the first packet.

The instructions, when executed, may further cause the processor to forward the first packet to an assigned security application instance upon determining that the first unidirectional packet flow has been assigned for processing to one of the plurality of security application instances, or upon recording of a security application instance identifier for the security application instance to which the first unidirectional packet flow is assigned for processing in a third flow database. The instructions, when executed, may further cause the processor to discharge the first packet from a second logical side of the security control point in the communications network upon determining that the flow identifier of the first packet is in the first flow database. The instructions, when executed, may further cause the processor to disable the following steps for a predetermined type of security application: the determining whether a first flow identifier for the processed first packet is in a first flow database; the recording the first flow identifier for the processed first packet in the first flow database upon determining that the first flow identifier for the processed first packet is not in the first flow database; and the recording in a second flow database (i) a second flow identifier for a return packet flow of the first unidirectional packet flow, and (ii) a first security application instance identifier of the security application instance that processed the first packet.

The instructions, when executed, may further cause the processor to only perform the following steps for a predetermined range of IP source and/or IP destination addresses of the first packet: the determining whether a first flow identifier for the processed first packet is in a first flow database; the recording the first flow identifier for the processed first packet in the first flow database upon determining that the first flow identifier for the processed first packet is not in the first flow database; and the recording in a second flow database (i) a second flow identifier for a return packet flow of the first unidirectional packet flow, and (ii) a first security application instance identifier of the security application instance that processed the first packet.

The instructions, when executed, may further cause the processor to receive, at a second logical side of the security control point in the communications network, a second packet that is part of a second unidirectional packet flow from the second network security zone to the first network security zone; determine whether the second packet is from a packet flow that has been assigned to any one of the plurality of security application instances; process the second packet by one of the plurality of security application instances; determine whether a third flow identifier for the processed second packet is in a fourth flow database; record the third flow identifier for the processed second packet in the fourth flow database upon determining that the third flow identifier for the processed second packet is not in the fourth flow database; and record in the third flow database (i) a fourth flow identifier for a return packet flow of the second unidirectional packet flow, and (ii) a second security application instance identifier that processed the second packet.

The instructions, when executed, may further cause the processor to forward the second packet to an assigned security application instance upon determining that the second unidirectional packet flow has been assigned for processing to one of the plurality of security application instances, or upon recording of a security application instance identifier for the security application instances to which the second unidirectional packet flow is assigned for processing in the third flow database. The instructions, when executed, may further cause the processor to discharge the second packet from the first logical side of the security control point in the communications network upon determining that the flow identifier of the second packet is in the fourth flow database. The instructions, when executed, may further cause the processor to run the plurality of security application instances on a combination of a first host machine and a second host machine, wherein the first host machine and the second host machine are remotely located from each other. The first host machine may comprise a first load balancer and the second host machine may comprise a second load balancer, and wherein the instructions, when executed, may further cause the processor to instruct the first load balancer to (i) assign the first packet to one of the security application instances running on the second host machine, and (ii) forward the first packet to the second load balancer, and instruct the second load balancer to forward the first packet to the one of the security application instances running on the second host machine.

Another embodiment provides a machine-readable storage medium comprising computer-executable instructions that when executed cause a processor of a computing device to receive packets that are part of a bidirectional packet flow between a pair of network security zones in a communications network; determine, based on relative loading of a plurality of identical instances of a security application running on a host machine, one instance of the plurality of identical instances of the security application to which to assign the bidirectional packet flow for security processing; direct all of the received packets that are part of the bidirectional packet flow for processing on the host machine by one of the security application instances; and search for a flow identifier of a received packet in multiple flow databases after the received packet undergoes security processing.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a block diagram illustrating a security processing system for handling the flow of packets in a communications network using a computing device.

Figure 1A:
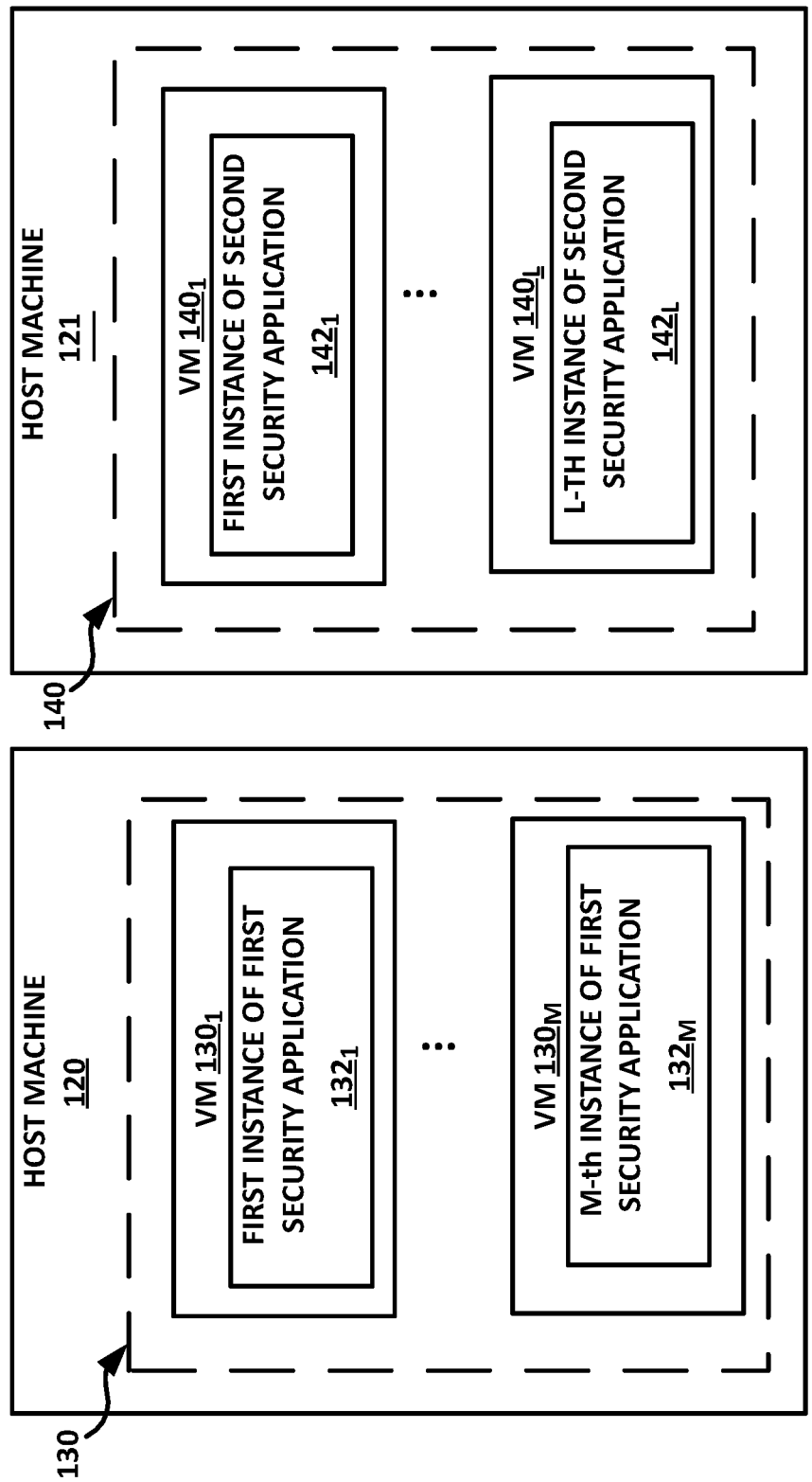
FIG. 1A is a block diagram of example host machines hosting multiple Virtual Machines.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAIL DESCRIPTION

All illustrations of the drawings are for the purpose of describing selected versions of the embodiments herein and are not intended to limit the scope of the embodiments herein.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrate the best mode of practicing the embodiments herein. Upon reading the following description in light of the accompanying drawing figures, those skilled in the art will understand the concepts of the disclosure and will recognize applications of these concepts not particularly addressed herein.

The terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/or" includes any and all combinations of one or more of the associated listed items.

Moreover, when an element is referred to as being "connected", "operatively connected", or "coupled" to another element, it can be directly connected or coupled to the other element or intervening elements may be present. Conversely, when an element is referred to as being "directly connected" or "directly coupled" to another element, there are no intervening elements present.

Furthermore, although the terms "upper", "lower", "bottom", "side", "intermediate", "middle", and "top" or other positional and/or directional descriptions etc. may be used herein to describe various elements, but these elements should not be limited by these terms. These terms are only used to distinguish one element from another. For example, a first element could be termed an "top" element and, similarly, a second element could be termed a "top" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprise(s)", "comprising", "include(s)", and/or "including" when used herein specify the presence of stated features, integers, steps, operations, elements, and/or components, but do not preclude the presence or addition of one or more other features, integers, steps, operations, elements, components, and/or groups thereof. Referring to the drawings, and more particularly to FIGS. 1A through 5, there are shown embodiments herein. In FIGS. 1 through 5 similar reference characters denote corresponding features consistently throughout the figures. Moreover, in the drawings, the size and relative sizes of components, layers, and regions, etc. may be exaggerated for clarity.

Communication traffic can take any of various forms and include any of various types of information. Data flows and data packets as referenced herein are examples of communication traffic to which the embodiments disclosed herein could be applied. The present disclosure is not necessarily limited to transfer of data, or to data or information that is specifically formatted into packets. Features that are disclosed herein with reference to data flows or data traffic could be applied to communication traffic other than data flows, to communication traffic that is formatted into blocks other than packets, and/or to communication traffic that includes content or payloads other than strictly data.

Data packets are organized according to protocols such as, for example, the Transmission Control Protocol (TCP) or the File Transfer Protocol (FTP). A data packet is typically organized into a header and a payload. The header contains information about the data packet such as its source and destination addresses. The payload is the actual data to be transferred.

A unidirectional packet "flow" is a unidirectional movement of data packets with a set of common characteristics. A set of common characteristics could be, for example, the packets' Internet Protocol (IP) source and destination addresses, IP protocol version, source and destination port addresses or numbers, and IP class of service. A subset of one or more of these characteristics, and/or other packet characteristics, could be used to define a unidirectional packet flow. The set of common characteristics which define a unidirectional packet flow is also called the flow key or the flow identifier.

Although all packets in a flow generally have a set of common characteristics there are circumstances under which this might not be the case. A communication appliance might for example, as part of its processing, employ Network Address Translation (NAT) and change the IP source address of packets in a unidirectional flow to an inside global address from an inside local address. The inside local address could be completely different from the inside global address. In this case the characteristics of the packet after processing might be different from the characteristics of the packet before processing.

Data communications could be two-way and comprise a first unidirectional originating packet flow sent from a first host to a second host and a corresponding second unidirectional return packet flow sent from the second host to the first host in response to the first unidirectional packet flow. For example, a first host could send a request to a second host for the contents of a web page. The second host could then send the web page to the first host. Two-way communications could use any two-way communications protocol such as TCP, for example. The combination of a unidirectional packet flow and its corresponding unidirectional return packet flow is called a bidirectional packet flow. A unidirectional packet flow may also be referred to herein as a unidirectional flow, and similarly a bidirectional packet flow may also be referred to herein as a bidirectional flow.

Scaling network security to meet increased communication traffic volumes could be a challenge. One approach is to "scale up". In the scale up approach, increasingly larger capacity security appliances are installed to handle increases in the volume of communication traffic.

Another approach is to "scale out". In this approach, the security task is spread across multiple security appliances running in parallel and additional security appliances are added incrementally to keep up with increases in traffic volume.

Virtualization

One way to implement scale out is using virtualization. In this approach, instead of using purpose-built security hardware, "virtual" security appliances are implemented using one or more hardware components such as, for example, a multi-processor x86 server and/or other computing hardware to execute security application software. A security application, when executed, could cause or otherwise configure computing hardware to perform all the functions of a physical security appliance. Examples of security applications include firewalls, Intrusion Detection Systems (IDS s), Intrusion Prevention Systems and Network Security Monitors. Virtualization could be more economical than using purpose-built security hardware due to the relatively low cost and wide availability of general-purpose computing hardware and its continually improving performance.

Virtualization could also allow security capacity to be adjusted faster than with purpose-built security hardware. For example, additional instances of a security application could be quickly created and added to a server to meet higher levels of traffic without deploying any additional purpose-built security hardware. Conversely, at low traffic levels, security application instances could be removed to save on software licensing costs. The security application instances could be configured identically with identical security policies and identical security behaviors. Such identically configured instances of the same security application may be referred to as homogeneous instances, and/or as providing homogeneity among multiple security application instances.

A security application could run on a Virtual Machine (VM). A VM is a software emulation of a computer system. A VM runs on a physical computer or computing hardware, such as for example, a multi-processor x86 server. This physical computer is frequently referred to as a "host" machine. Multiple VMs can run on the same host machine. A VM could have configurable amounts of resources, such as computing, memory and/or communication bandwidth resources.

VMs can be created or removed from the host machine. A VM can run its own operating system. VMs on the same host machine can run different operating systems or versions of operating systems. For example, one VM might run a version of the Windows® operating system while a second VM on the same host machine might run a version of the Linux® operating system.

In one embodiment, a VM runs one and only one instance of a security application. VMs could be organized into VM "clusters" with all VMs in a cluster running identical instances of the same security application and each instance configured with identical security policies and security behaviors. In this sense, a VM cluster may also be considered homogeneous. A VM cluster could run on a single host machine or multiple machines. There could be multiple VM clusters, each running on its own host machine. An example of a VM cluster is the HA4 firewall cluster made by Palo Alto Networks of Santa Clara, California (USA).

FIG. 1A is a block diagram of example host machines hosting multiple VMs. Host machine 120 hosts a first VM cluster 130. Host machine 121 hosts a second VM cluster 140. VM cluster 130 comprises "M" individual VMs $130_1 \ldots 130_M$. VMs $130_1 \ldots 130_M$ each run respective instances $132_1 \ldots 132_M$ of a first security application. VM cluster 140 comprises "L" individual VMs $140_1 \ldots 140_L$. VMs $140_1 \ldots 140_L$ each run respective instances $142_1 \ldots 142_L$ of a second security application. In some implementations first security application instances $132_1 \ldots 132_M$ are identical to second security applications $142_1 \ldots 142_L$. In some implementations host machines 120, 121 are in different physical locations to protect the security system against a complete failure due to a catastrophic event such as a fire, flood, earthquake etc.

FIG. 1A is an example only and host machines 120, 121 could instead host multiple VM clusters running additional instances of additional security applications. In general, it is expected that all instances of any particular security application will be running in one VM cluster. However, it should be appreciated that in general there may be one or more VM clusters to run one or more instances of a security application. Examples of security applications that could run on VMs such as any of the VMs $130_1 \ldots 130_M$ and $140_1 \ldots 140_L$ of FIG. 1A include firewalls, Intrusion Detection Systems (IDS), Intrusion Prevention Systems, and Network Security Monitors.

Security Control Points

Figure 1B:
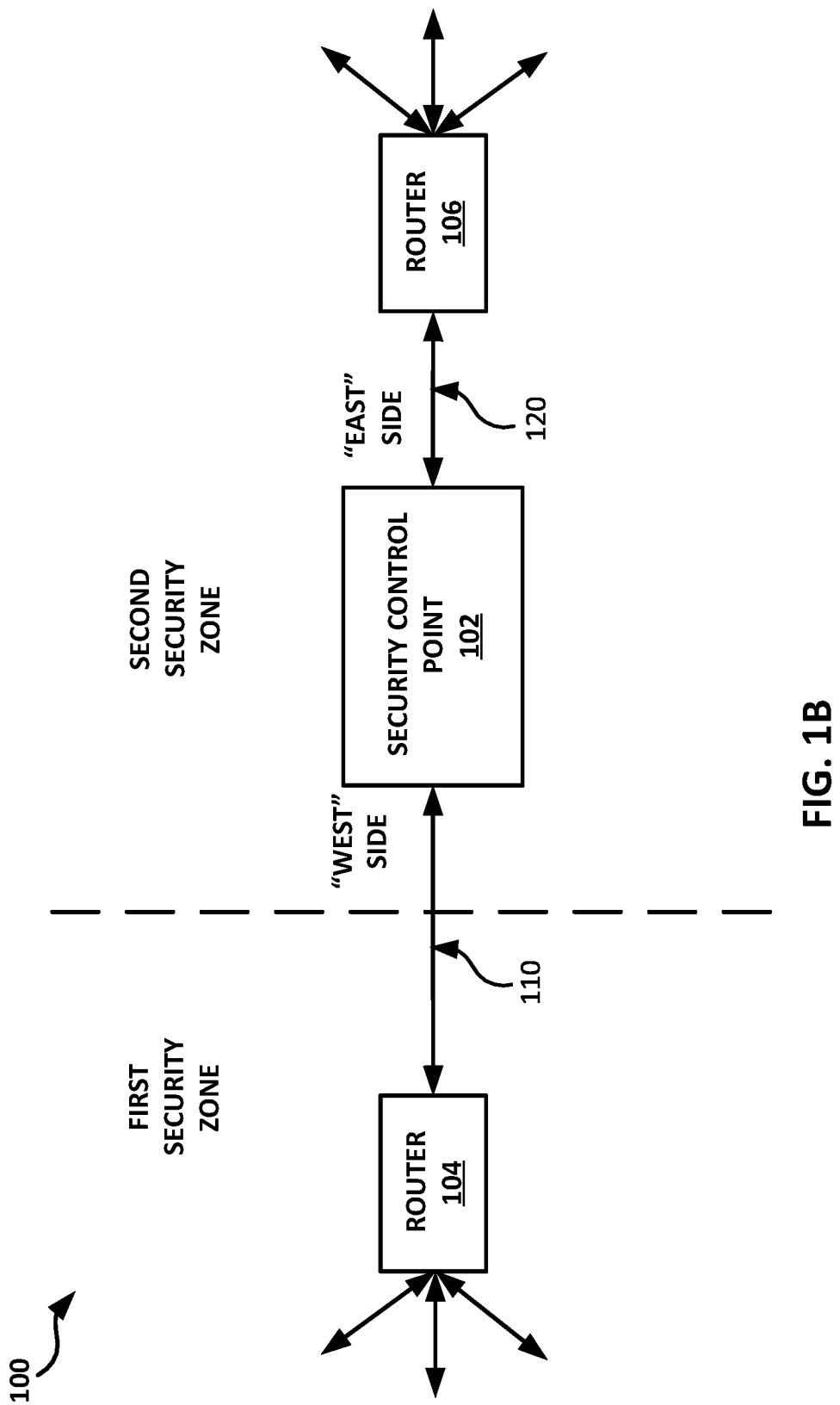
FIG. 1B is a block diagram depicting an example security control point implementation in a communications network.

Security control points are used to ensure network security. A security control point is typically placed at the boundary between two different security zones and the two security zones connect to each other through the security control point. The control point monitors the traffic between the security zone and protects against threats. FIG. 1B is a block diagram depicting an example security control point implementation in a communications network 100. Security control point 102 is positioned between packet routers 104, 106 and all packet traffic travelling between routers 104, 106 passes through security control point 102. Router 104 is in a first security zone and router 106 is in a second security zone. A security zone is a collection of networked hosts (e.g., servers, user workstations) with a common set of access security policies. Connections 110, 120 provide connectivity between security control point 102 and routers 104, 106, respectively. Connections 110, 120 could be any of various types of wired or wireless connection media used to implement network connectivity, including optical fiber, co-axial cable, twisted pairs, Wi-Fi, wireless, microwave connectivity or any combination thereof.

In one embodiment, router 106 is a gateway router placed at the perimeter of a private network such as a Local Area Network (LAN) and router 104 is an Internet Service Provider (ISP) or an internet exchange peering point. In this embodiment, security control point 102 could protect the private network from attacks from the Internet. FIG. 1B is an example only and other placements of a security control point are possible. For example, routers 104, 106 could both be inside a corporate network. Router 104 could be inside one corporate security zone, router 106 could be inside a different corporate security zone, and security control point 102 could be placed between them. In this case, security control point 102 could protect each security zone from attacks originating in the other security zone.

In another example, router 106 could be inside a data center and router 104 could be at an ISP or an internet exchange peering point. The data center could have multiple tenants, each with their own security policies. Security control point 102 could connect the data center to the internet and security control point 102 could enforce different security policies for the different data center tenants.

A security control point could connect other types of network nodes instead of routers. For example, an Ethernet switch or a PC (Personal Computer) could be connected to another component through a security control point. In general, a security control point connects two different network nodes in two different security zones and mitigates attacks on one security zone, and potentially either security zone, from the other security zone.

Security control point 102 is bidirectional. A packet can enter security control point 102 at its "WEST" side from router 104 and exit from the security control point's "EAST" side to router 106. A packet can also enter security control point 102 at its "EAST" side from router 106 and exit from the "WEST" side to router 104. Packets could also enter and exit from the same side (e.g., enter and exit security control point 102 at its "WEST" side). This is commonly called "hairpinning".

Security control point "EAST" and "WEST" sides" referenced herein are intended solely to refer to logical rather than physical sides of the security control point and illustrate different directions of packet flow. For example, an interface to receive or transmit packet traffic need not be located at a physical side of a security control point. Also, "EAST" side and "WEST" side traffic could be received by physically adjacent receive interfaces that are not located at different physical sides of a security control point, or even by a single physical interface that receives multiplexed incoming traffic for both "EAST" to "WEST" and "WEST" to "EAST" traffic flow directions. Similarly, "EAST" side and "WEST" side transmit interfaces need not be located at physically different sides of a security control point, or a single transmit interface could be used to transmit outgoing multiplexed "EAST" side and "WEST" side traffic from a security control point.

Security Application Load Balancing

A security control point could comprise a plurality of instances of security application instances and a Security Application Load Balancer (SALB). The SALB and the security application instances could all run on a single host machine. The security application instances could each run on individual VMs hosted by the host machine, for example. The host machine could be a piece of commodity computing hardware such as for example, a multi-processor x86 server.

The SALB could be configured to distribute received packet flows across multiple instances of a security application for processing by the security application instances. The SALB could be configured to distribute the processing load between the multiple security application instances as evenly as possible (load balance). Running the SALB and the security application instances on the same host machine could enable the load balancer and the security application instances to use shared memory which could allow fast communication between them.

Running the SALB and the security application instances on the same host machine could also allow easy monitoring of the state of the security application instances by the SALB. The SALB could, for example, use Bidirectional Forwarding Detection (BFD) and periodically send test packets to a security application instance and monitor the security application instance's output to ensure the test packet was processed. The SALB and the security application instances could all run on a single host machine and the SALB could off-load some tasks to ancillary hardware. For example, the SALB could off-load the attachment and removal of a packet's VLAN tags to a Network Interface Card (NIC). A NIC is a hardware component that allows a computing device to connect to a network and implements the physical layer circuitry necessary for communicating. As another example, the SALB could off-load the searching of a flow table or a flow database for a flow identifier to a NIC. The security application instances could all run on a single host machine and the SALB could instead be a separate piece of computing hardware optimized or otherwise configured to classify packets and balance the loading of the security application instances running on host machine(s).

Stateful Load Balancing

It could be desirable for the load balancing across security application instances to be "stateful". In stateful load balancing a SALB attempts to send all packets in a packet flow to the same security application instance rather than potentially distributing them across multiple security application instances.

Stateful load balancing could minimize the disruption to communications caused by the removal or disablement of a security application instance. Referring to FIG. 1A, if communication traffic is being statefully load balanced across the "M" instances of a security application $132_1 \ldots 132_M$ and one instance is removed or disabled (for example $132_1$), then any packet flow assigned to security application instance $132_1$ could be disrupted. However, all other flows assigned to the remaining instances ($132_2 \ldots 132_M$) will not be disrupted as they will continue to be handled by the remaining security application instances to which they are assigned. If load balancing is not stateful then it is possible that some packets from different flows might be assigned to the removed or disabled security application instance. In this case all these flows could be disrupted, even if only a few of their packets had been sent to the removed or disabled security application instance.

A security application instance could be removed for any of several reasons. For example, the security application might need to be upgraded or replaced with a new version. As another example, the number of security application instances might not be optimal. There could be too little traffic to justify the number of security application instances that are running. Each instance could incur a software license fee and the amount of traffic might not justify the expense. As another example, a security application instance might require removal because it has stopped working and processing packets ("crashed").

To implement stateful load balancing a record could be kept of which security application instance the first packet in a flow is forwarded to and all subsequent packets in the same flow could be forwarded to the same security application instance. The record could be recorded in a flow database. The flow database could be accessed by the SALB to determine to which security application instance all subsequent packets in a flow should be sent.

The flow database could be a flow table and comprise a plurality of entries wherein each entry comprises a flow identifier and a corresponding security application instance identifier. The security application instance identifier could identify the specific security application instance to which the flow is assigned. In one embodiment a security application instance identifier could identify to which SALB output port a security application instance is connected. An output port could be virtual. For example, the input of a security application instance could connect to the output of a SALB through a VIRTual interface (VIRT). A VIRT is an abstract virtualized representation of a network interface. There could be one VIRT for each security application instance. The security application instance identifier could then be the identity or address of the VIRT to which the input of a specific security application instance is connected.

A flow identifier identifies a particular flow. A flow identifier could be constructed from a packet's header information. For example, a commonly used flow identifier contains the packet's Internet Protocol (IP) source and destination addresses, source and destination port numbers and the protocol and is commonly referred to as a 5-tuple. Other flow identifiers are possible and could be created, for example, using the well-known OpenFlow protocol.

It could be advantageous for stateful load balancing to operate on bidirectional flows and for a SALB to perform bidirectional stateful load balancing. In bidirectional stateful load balancing all packets in a bidirectional flow are passed to the same security application instance by the load balancer. Bidirectional stateful load balancing could be advantageous for certain types of security services, such as, for example, Transport Layer Security (TLS) or Secure Socket Layer (SSL) decryption or firewalling.

Bidirectional stateful load balancing could also be advantageous from a security application instance loading perspective. The volume of data in a first unidirectional flow and its corresponding unidirectional return flow can be quite different. For example, the data volume in a unidirectional flow comprising of a request for an image from a web site could be much smaller than the data volume of the corresponding return flow carrying the image. The data volume difference between the two unidirectional flows could be more effectively averaged if they are both sent to the same security application instance than if they were sent to different instances.

In one embodiment, packets that are part of a bidirectional packet flow between network security zones are received by the security control point and a determination is made as to which one of the security application instances to assign the bidirectional packet flow to. All of the received packets that are part of the bidirectional packet flow are directed for processing to that one of the security application instances.
Symmetric Hashing The security application instance to which the first packet in a bidirectional flow is directed could be determined based on a hashing of the packet's header information. Hashing is a mathematical operation which maps data of arbitrary size to a fixed and usually smaller size. The hashing operation could be directionally symmetric and designed to produce identical hash values for all packets in a given bidirectional packet flow.

Packets in a unidirectional flow and packets in the corresponding unidirectional return flow typically have their IP source and destination addresses transposed and their source and destination port numbers transposed. For example, the IP source address of the unidirectional flow is the IP destination address of the corresponding unidirectional return flow, and the IP destination address of the unidirectional flow is the IP source address of the corresponding unidirectional return flow. Similarly, the source port number of the unidirectional flow is the destination port number of the corresponding unidirectional return flow, and the destination port number of the unidirectional flow is the source port number of the corresponding unidirectional return flow.

A directionally symmetric hash could produce the same hash result regardless of whether the source and destination IP addresses and port numbers are transposed. For example, the directionally symmetric hash might perform an exclusive OR of the source and destination IP addresses and an exclusive OR of the source and destination port numbers as part of the hashing operation. The hash result might be subject to a modulo operation based on the number of security application instances. For example, if there were "N" instances of a security application then a modulo N operation could be performed on the hash result to return a value from 0 to N−1. The modulo result could then be used to determine which of the N security application instances to assign the packet to. This modulo result could also be stored in a flow database as the security application instance identifier for the flow to which the packet belongs.

In bidirectional stateful load balancing a flow identifier could identify a packet flow. A record could be kept tracking the security application instance to which the first packet in a bidirectional flow is forwarded to and all subsequent packets in the same bidirectional flow could be forwarded to the same security application instance. The record could be recorded in a flow database for example.

A directionally symmetric hash might not produce identical hash values for all packets in a given bidirectional flow if the packet's header information is changed by the security application instance. For example, if the IP source or destination addresses of a packet's header were changed by the security application instance then the hash values calculated for packets in the return flow might not correspond to the hash values of the packets in the originating flow.
Flow Database A flow database could be a flow table and comprise a plurality of entries wherein each entry comprises a flow identifier and a security application instance identifier. The security application instance identifier could identify the specific security application instance to which the flow is assigned. In one embodiment, a security application instance identifier could identify to which SALB output a security application instance is connected. For example, the input of a security application instance could connect to the output of the SALB through a virtual interface (VIRT). There could be one VIRT for each security application instance. The security application instance identifier could then be the address or identity of the VIRT to which the input of a specific security application instance is connected.

There could be more than one flow database. For example, referring to FIG. 1B there could be a flow database for packets entering from the EAST side of security control point 102 and a second flow database for packets entering from the WEST side of security control point 102. There could be a flow database for packets leaving from the EAST side of security control point 102 and a second flow database for packets leaving from the WEST side of security control point 102. Multiple flow databases could reduce the search time of a flow database by reducing the number of entries in a given flow database.

The flow identifier could be based on the packet's header information. For example, the flow identifier could comprise the packet's Internet Protocol (IP) source and destination addresses, source and destination port numbers and the IP protocol (a 5-tuple). Other flow identifiers could also be used. For example, only a packet's IP source and destination addresses could be used (a 2-tuple). This could reduce the number of entries in the flow database and decrease its search time. Other flow identifiers are possible and could be implemented using, for example, the Openflow protocol. A flow database could use different types of flow identifiers. For example, a flow database could use flow identifiers based on a 5-tuple and on a 2-tuple.

Figure 2:
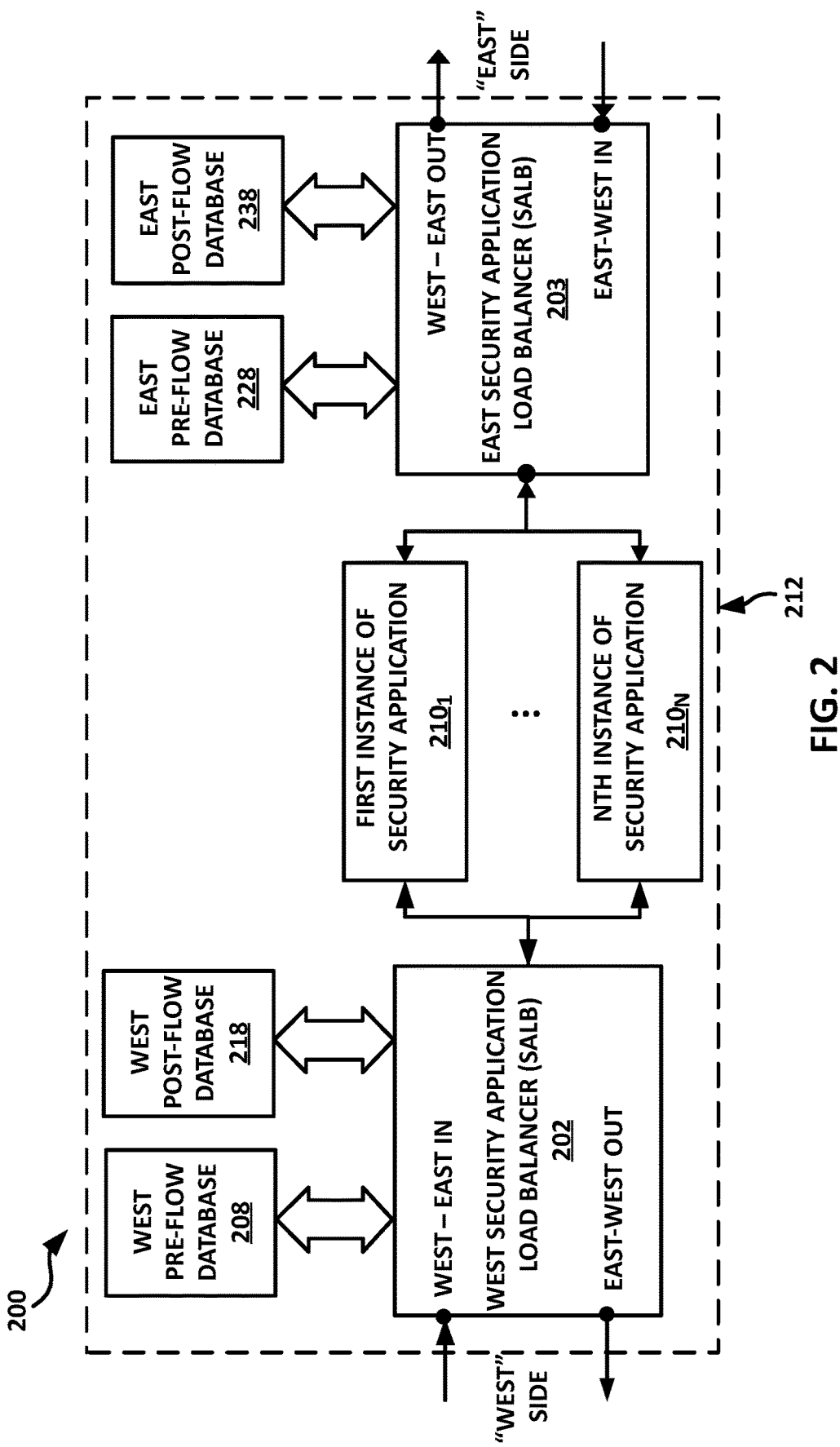
FIG. 2 is a block diagram of an example security control point.

FIG. 2 is a block diagram of an example security control point. Security control point 200 runs on host machine 212 which could be implemented using computing hardware such as a commodity server, for example. Security control point 200 comprises WEST SALB 202, EAST SALB 203, WEST pre-flow database 208, WEST post-flow database 218, EAST pre-flow database 228, EAST post-flow database 238, and security application instances $210_1$ ... $210_N$. WEST SALB 202 communicates with WEST pre-flow database 208 and WEST post-flow database 218. EAST SALB 203 communicates with EAST pre-flow database 228 and EAST post-flow database 238. WEST SALB 202 sends and receives packets to/from security application instances $210_1$-$210_N$. EAST SALB 203 sends and receives packets to/from security application instances $210_1$-$210_N$.

Security application instances $210_1$ ... $210_N$ could each be running on their own virtual machine (not shown). FIG. 2 is an example only and security application instances $210_1$ ... $210_N$ could also be hosted on multiple host machines as described previously. Although EAST SALB and WEST SALB are shown as separate blocks they could share common processing functions such as, for example, a symmetrical hashing function, or a security application instance monitoring function and/or a forwarding of packets function.

Referring to FIG. 2, EAST SALB 203 receives packets traveling in the EAST to WEST direction at its EAST to WEST input interface (EAST-WEST IN). WEST SALB 202 receives packets traveling in the WEST to EAST direction at its WEST to EAST input interface (WEST-EAST IN). WEST SALB 202 and EAST SALB 203 both assign flows to security application instances $210_1$ ... $210_N$ in a stateful manner, according to which all packets in any particular bidirectional flow are sent to the same one of security application instances $210_1$ ... $210_N$.

Packets in a flow traveling in the EAST to WEST direction enter EAST SALB 203 at its EAST to WEST input interface (EAST-WEST IN) and are sent to one of security application instances $210_1$ ... $210_N$. If a packet is not being dropped or otherwise removed from their packet flow by the security application instance, the packet enters WEST SALB 202 and then exits WEST SALB 202 at its EAST-WEST output port (EAST-WEST OUT of FIG. 2). The output interface could be or include a physical interface such as an optical fiber or copper cable, or it could be or include a virtual function interface such as Single Root I/O Virtualization (SR-10V), for example, or a hypervisor emulated interface. EAST SALB 203 could communicate with security application instances $210_1$ ... $210_N$ through a plurality of virtual interfaces, as described previously.

Referring to FIG. 1B, the packets could then be transmitted over a connection, such as connection 120 in FIG. 1B, to a device attached to the security control point's WEST side, such as router 106 of FIG. 1B, for example. Referring again to FIG. 2, packets in a flow traveling in the WEST to EAST direction enter WEST SALB 202 at its WEST to EAST input interface (WEST-EAST IN) are directed to one of security application instances $210_1$ ... $210_N$. If a packet is not dropped or otherwise removed from the packet flow by the security application instance, the packet enters EAST SALB 203 and then exits EAST SALB 203 at its WEST-EAST output port (WEST-EAST OUT of FIG. 2). The output interface could be or include a physical interface such as an optical fiber or copper cable, or it could be or include a logical interface such as a VLAN. WEST SALB 202 could communicate with security application instances $210_1$ ... $210_N$ through a plurality of virtual interfaces, as described previously.

Referring to FIG. 1B the packet could then be transmitted over a connection, such as connection 110 in FIG. 1B, to a device attached to the security control point's EAST side, such as router 104 of FIG. 1B, for example. WEST SALB 202 and EAST SALB 203 communicate with pre-flow databases 208 and 228 respectively to, for example, determine whether a received packet is from a known flow that has been previously assigned to one of security application instances $210_1$ ... $210_N$ and/or to record the assignment of a new packet flow to a security application instance.

Figure 3:
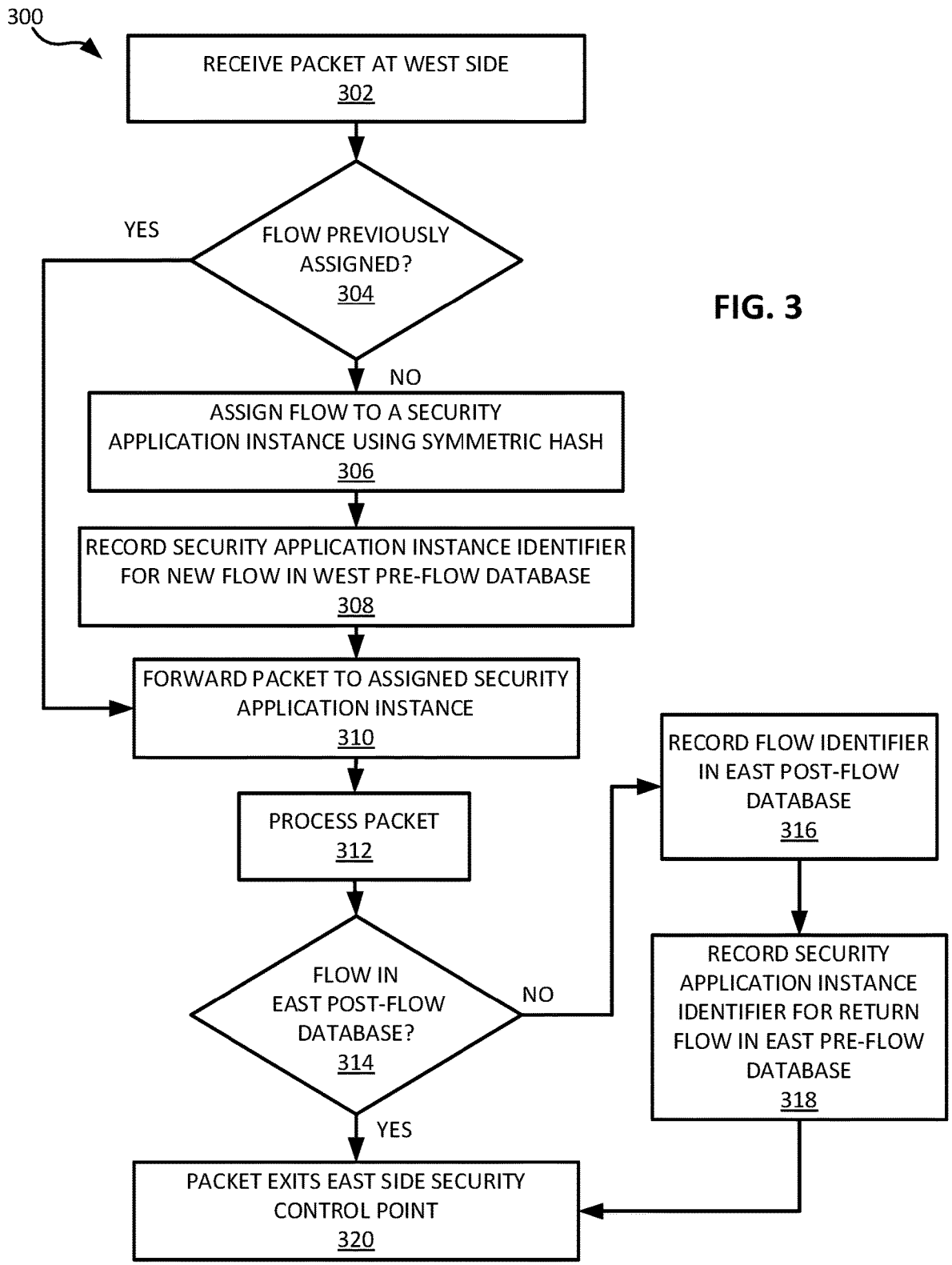
FIG. 3 is a flow diagram of an example stateful, bidirectional load balancing method.

FIG. 3 is a flow diagram of an example stateful, bidirectional load balancing method 300. At block 302 a packet is received at the SALB's WEST side (for example the WEST-EAST IN port of WEST SALB 202 of FIG. 2). At block 302 the packet's flow identifier could also be determined by inspecting the packet's header information or the flow identifier could be previously determined. At block 304 the SALB could determine whether the packet is from a flow which has an assigned security application instance. The SALB could search a flow database (for example WEST pre-flow database 208 of FIG. 2) for the packet's flow identifier to make this determination. If the packet is from a flow for which there is an assigned security application instance (YES at decision block 304) then at block 310 it is forwarded to that security application instance, for example, one of security application instances $210_1$ ... $210_N$.

If the packet is from a flow for which there is no assigned security application instance (NO at decision block 304) then at block 306 the packet's flow is assigned a security application instance from the available security application instances. The assignment by the SALB could be based on taking the modulo of the result of a symmetric hashing operation performed on the packet's header information as previously described.

At block 308 an identifier of the security application instance to which the bidirectional flow was assigned at 306 is recorded. Recording could involve recording the packet's flow identifier and the security application instance identifier in a flow database in memory, such as the WEST pre-flow database 208 of FIG. 2. At block 310 the packet is forwarded to its assigned security application instance, for example one of security application instances $210_1 \ldots 210_N$ of FIG. 2.

At block 312 the packet is processed by the security application instance. If the packet is not dropped or removed by the security application at block 312 it is forwarded to the EAST side of the SALB (for example EAST SALB 203 of FIG. 2). At decision block 314 a flow database (such as EAST post-flow database 238) is searched for the packet's flow identifier. If the flow identifier is found (YES at decision block 314) then the packet exits the security control point at block 320 (for example, the WEST-EAST output port of EAST SALB 203 of FIG. 2.) If the flow identifier is not found (NO at decision block 314) then the flow identifier is entered in a flow database (for example EAST post-flow database 228 of FIG. 2) at block 316. At block 318 the flow identifier for the corresponding return flow and the security application instance identifier which processed the packet are recorded in a flow database (for example EAST pre-flow database 228 of FIG. 2).

The flow identifier for the corresponding return flow could be a 5-tuple created by the transposition of the packet's source and destination IP addresses and port numbers, for example. The flow identifier could use the packet's IP source address and source port number as its IP destination address and destination port number and the packet's IP destination address and destination port as its IP source address and source port number. Other flow identifiers could be used. As an example, the flow identifier for the corresponding return flow could be a 2-tuple created by the transposition of the packet's source or destination IP addresses. The packet exits the security control point at 320 (for example, the WEST-EAST output port of EAST SALB 203 of FIG. 2.). The method for handling packets entering the security point's EAST side is symmetric to the method of FIG. 3 with the EAST and WEST designations transposed.

Figure 4:
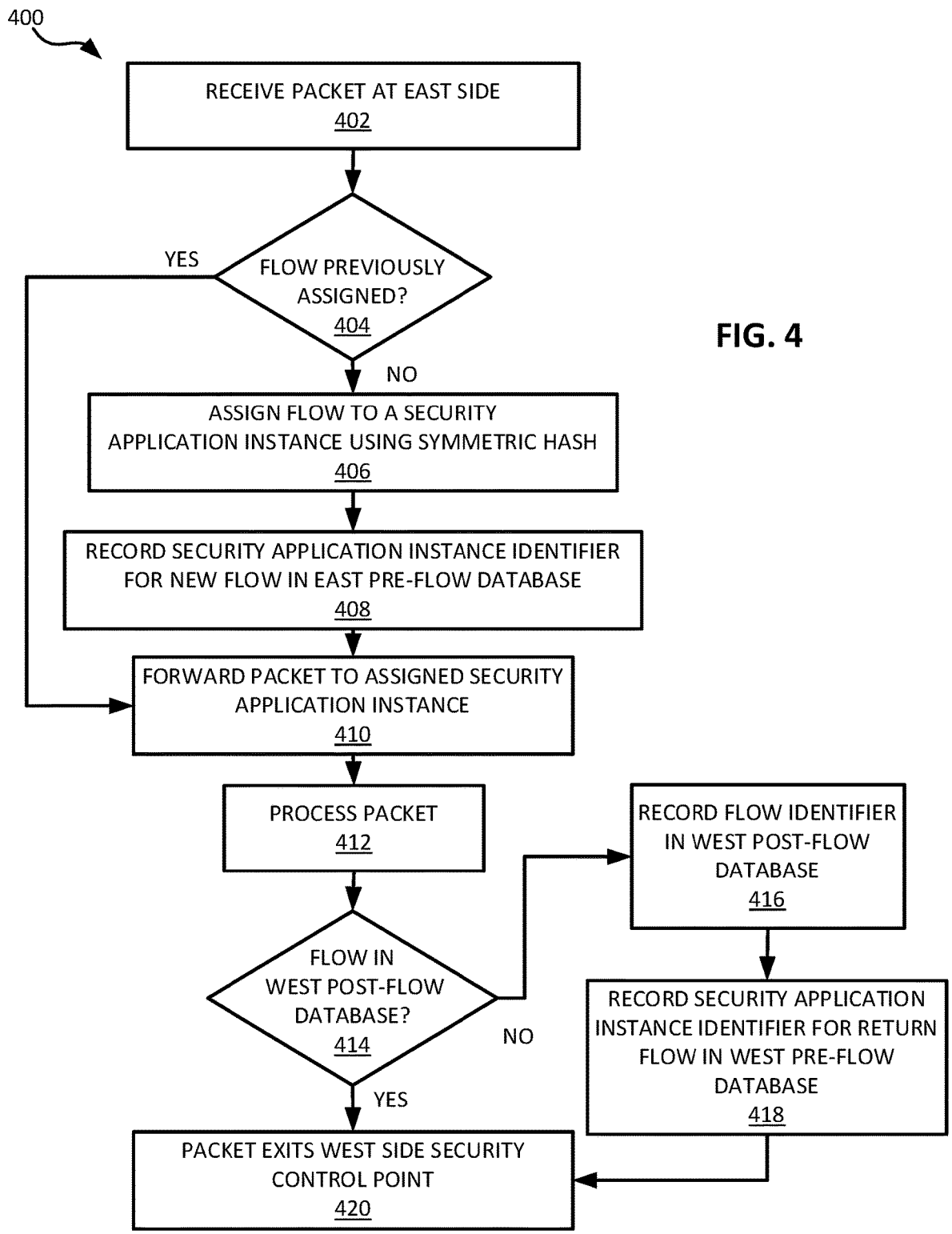
FIG. 4 is a flow diagram of an example stateful, bidirectional load balancing method for packets traveling in an EAST to WEST direction.

FIG. 4 is a flow diagram of an example stateful, bidirectional load balancing method 400 for packets traveling in an EAST to WEST direction. At block 402 a packet is received at the SALB's EAST side (for example the EAST-WEST IN port of EAST SALB 202 of FIG. 2). At block 402 the packet's flow identifier could also be determined by inspecting the packet's header information or the flow identifier could be previously determined.

At decision block 404 the SALB could determine whether the packet is from a packet flow which has an assigned security application instance. The SALB could search a flow database (for example EAST pre-flow database 228 of FIG. 2) for the packet's flow identifier to make this determination. If the packet is from a packet flow for which there is an assigned security application instance (YES at decision block 404) then at block 410 it is forwarded to that security application instance, for example, one of security application instances $210_1 \ldots 210_N$.

If the packet is from a flow for which there is no assigned security application instance (NO at decision block 404) then at block 406 the packet's flow is assigned a security application instance from the available security application instances. The assignment by the SALB could be based on taking the modulo of the result of a symmetric hashing operation performed on the packet's header information as previously described. At block 408 an identifier of the security application instance to which the bidirectional flow was assigned at block 406 is recorded. Recording could involve recording the packet's flow identifier and the security application instance identifier in a flow database in memory, such as the EAST pre-flow database 228 of FIG. 2.

At block 410 the packet is forwarded to its assigned security application instance, for example one of security application instances $210_1 \ldots 210_N$ of FIG. 2. At block 412 the packet is processed by the security application instance. If the packet is not dropped or removed by the security application at block 412 it is forwarded to the WEST side of the SALB (for example WEST SALB 202 of FIG. 2). At decision block 414 a flow database (such as WEST post-flow database 218) is searched for the packet's flow identifier. If the flow identifier is found (YES at decision block 414) then the packet exits the security control point at block 420 (for example, the EAST-WEST output port of WEST SALB 202 of FIG. 2.).

If the flow identifier is not found (NO at decision block 414) then the flow identifier is entered in a flow database (for example WEST post-flow database) at block 416. At block 418 the flow identifier for the corresponding return flow and the security application instance identifier which processed the packet are recorded in a flow database (for example WEST pre-flow database 208 of FIG. 2). The flow identifier for the corresponding return flow could be created in a manner similar to the manner described for method 300. The packet exits the security control point at block 420 (for example, the EAST-WEST output port of WEST SALB 202 of FIG. 2.).

Network Address Translation

A security application instance might, as part of its processing employ Network Address Translation (NAT) and change the IP source address of packets in a unidirectional flow (travelling, for example, in the WEST to EAST direction of FIG. 2) to an inside global address from an inside local address. An inside global address is the address of a network device as seen from inside its own local network. An outside global address is the address of the network device as seen from outside its local network.

The inside local address could be completely different from the inside global address. The packets in the corresponding EAST to WEST unidirectional return flow will therefore have this inside global address as their IP destination address rather than the inside local address. A symmetric hash value generated from the packet headers of the EAST to WEST return flow cannot therefore be guaranteed to be the same as the symmetric hash value of packets of the originating WEST to EAST flow. If the security application instance assignment is only determined based on the hash value, then the packets in the EAST to WEST flow could be sent to a security application instance different from the WEST to EAST flow. Handling of the bi-directional flow might therefore not be stateful. A security application instance might make other changes to a packet's header information.

Methods 300 and 400 of FIGS. 3 and 4, with respect to FIGS. 1A through 2, could be robust against changes to packet's header information made by a security application instance and ensure stateful handling of bidirectional packet flows in a communications network such as communications network 100. In methods 300 and 400 a flow database (for example database 218 or 238) is searched for the flow identifier of a packet when it exits a security application instance (for example at decision block 314 of FIG. 3 or at decision block 414 of FIG. 4). If the packet's flow identifier is not found the flow identifier for the corresponding return flow of the packet and the packet's security application instance identifier are recorded in a flow database (for example block 318 of FIG. 3 or block 418 of FIG. 4). Any packets in the return flow will then be directed to the same security application instance as the originating flow. For example, consider a corresponding return flow entering the EAST side of a security control point, for example EAST-WEST IN of EAST SALB 203 of FIG. 2).

Referring to FIG. 4, at block 402 the packet is received. At decision block 404 the SALB determines whether the packet is from a flow which has an assigned security application instance. Since an entry will have previously been created for the return flow in the flow database by the originating packet (for example in EAST pre-flow database 228 by block 318 of method 300 in FIG. 3) the determination will be a YES at decision block 404. At block 410 the SALB forwards the packet to the packet flow's assigned security application instance.

A security application instance could alter the header information of a received packet in other ways. For example, the security application instance as part of its processing could create an IPSEC tunnel and encapsulate its processed packets. In this case the header information of the processed packets exiting the security application instance including the IP source and destination addresses, the IP port numbers or even the IP protocol could be completely changed. The header information in packets in the corresponding return flow return flow could therefore be completely different from the header information of the packets in the originating flow.

However, because the flow database is searched for the flow identifier of a packet when it exits a security application instance (for example decision block 314 of FIG. 3) and the return flow identifier and security application instance identifier are recorded in the flow database if the flow identifier is not found (for example block 318 of FIG. 3) the packets in the returning EAST to WEST flow will be directed to the same security application instance as the originating WEST to EAST flow regardless of changes in the header information (for example at decision 404 of FIG. 4).

Disabled Learning

In some situations, it could be beneficial to disable the creation of a flow database entry for a return flow from a packet exiting a security application instance ("learning") as done at, for example block 318 of FIG. 3 or block 418 of FIG. 4. For example, if it is known that the security application instances do not change the header information of a packet then the symmetrical hashing of a return packet's header (for example at block 406 of FIG. 4) will generate the same security application instance identifier as the originating packet.

Learning could be disabled by, for example, removing steps/blocks 314, 316, and 318 from method 300 of FIG. 3 or steps/blocks 414, 416, and 418 from method 400 of FIG. 4. A packet processed at block 312 would immediately exit the security control point and a packet processed at block 412 would immediately exit the security control point. Furthermore, learning could be selectively enabled. For example, learning could only apply to a range of IP source or destination addresses and be disabled for all other addresses. This could be beneficial, if, for example, only the header information for packets with that range of addresses could potentially be altered by the security application instances. For example, a firewall's NAT function might be configured to only translate some addresses. Additionally, learning could be automated. For example, a SALB could monitor a firewall's NAT configuration and only perform learning over the address ranges subject to translation.

Local and Remote Hosts

In addition to the implementations described previously, there could also or instead be additional host machines running additional security application instances. The SALB and some of the security application instances could run on the same host machine and additional security application instances could run on a second host machine. The second host machine could be located remotely from the first host machine to protect the security point from failure due to a catastrophic physical event such as a fire, flood, or earthquake.

A master SALB on the local machine could forward packets to security application instances running on the remote machine by first encapsulating or tagging the packets for each remote security application instance using an encapsulating or tagging technology such as, for example, VXLAN (Virtual Extensible Local Area Network) or VLAN (Virtual Local Area Network). Packets could be received by the remote host machine, processed by the assigned security application instance, re-encapsulated and sent back to the master SALB. The master SALB could determine which of the remote security application instances is to process a specific flow.

The second host machine could host a slave SALB with limited functionality. The slave SALB could direct packets to be processed by the security application instances running on the second host machine according to the information attached to the packets by the master SALB, for example a VXLAN tunnel ID (VNI) or a VLAN ID. There could instead be multiple host machines, each running a SALB and multiple security application instances.

Numerous modifications and variations of the present disclosure are possible in light of the above teachings. It is therefore to be understood that within the scope of the appended claims, the disclosure may be practiced otherwise than as specifically described herein. The divisions of functions represented in the drawings, for example, are solely for illustrative purposes. Other embodiments could include fewer, more, and/or different components than explicitly shown, interconnected in the same or a different order. For example, apparatus components may be configured to perform or enable any of various operations that are disclosed herein, in any of various combinations. Methods could similarly include fewer, more, and/or different operations performed in a similar or different manner than explicitly described herein.

In addition, although described primarily in the context of apparatus and methods, other implementations are also contemplated as provided in FIG. 5, with reference to FIGS. 1A through 4, as a system 500 containing computer-executable instructions 510 stored on a non-transitory processor-readable medium 505 of a computing device 512, for example. In an embodiment, the non-transitory processor-readable storage medium 505 stores the computer-executable instructions 510 which, when executed by a processor 545, cause the processor 545 to perform a method as provided in the computer-executable instructions 510 for handling packet flows between a pair of network security zones in a communications network 100. The processor 545 is to receive (525) packets that are part of a bidirectional packet flow between the network security zones; determine (530), based on relative loading of a plurality of identical instances of a security application $132_1 \ldots 132_M$, VM $142_1 \ldots$ VM $142_L$ running on a host machine 120, 121, one instance of the plurality of identical instances of the security application $132_1 \ldots 132_M$, VM $142_1 \ldots$ VM $142_L$ to which to assign the bidirectional packet flow for security processing; direct (535) all of the received packets that are part of the bidirectional packet flow for processing on the host machine 120, 121 by the one of the security application instances $132_1 \ldots 132_M$, VM $142_1 \ldots$ VM $142_L$; and search (540) for a flow identifier of a received packet in multiple flow databases 218, 238 after the received packet undergoes security processing.

In some examples, the processor 545 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process and/or execute computer logic instructions capable of providing digital and/or analog signals for performing various functions as described herein including controlling the operations of the computing device 512 and associated components. In some examples, the processor 545 may comprise a central processing unit (CPU) of the computing device 512. In other examples the processor 545 may be a discrete component independent of other processing components in the computing device 512. In other examples, the processor 545 may be a microprocessor, microcontroller, hardware engine, hardware pipeline, and/or other hardware-enabled device suitable for receiving, processing, operating, and performing various functions for the computing device 512. The processor 545 may be provided in the computing device 512, coupled to the computing device 512, or communicatively linked to the computing device 512 from a remote networked location, according to various examples.

The computing device 512 may comprise various controllers, switches, processors, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

Various examples described herein may include both hardware and software elements. The examples that are implemented in software may include firmware, resident software, microcode, etc. Other examples may include a computer program product configured to include the pre-configured set of computer-executable instructions 510, which when performed, may result in actions as stated in conjunction with the methods described herein. In an example, the pre-configured set of computer-executable instructions 510 may be stored on a tangible non-transitory computer readable medium 505 or a program storage device containing software code.

In the example of FIG. 5, the computing device 512 comprises or is communicatively linked to the processor 545 and the machine-readable storage medium 505. In an example, the processor 545 executes the computer-executable instructions 510 that when executed cause the processor 545 to perform computer-executable instructions 525-540. Processor 545 may include a central processing unit, microprocessors, hardware engines, and/or other hardware devices suitable for retrieval and execution of instructions stored in a machine-readable storage medium 505. Processor 545 may fetch, decode, and execute computer-executable instructions 510 to enable execution of locally-hosted or remotely-hosted applications for controlling action of the computing device 512. The remotely-hosted applications may be accessible on remotely-located devices; for example, remote communication device 515, which is accessible through a wired or wireless connection or communications network 100. For example, the remote communication device 515 may be a laptop computer, notebook computer, desktop computer, computer server, tablet device, smartphone, or other type of communication device. As an alternative or in addition to retrieving and executing computer-executable instructions 510, the processor 545 may include electronic circuits including a number of electronic components for performing the functionality of the computer-executable instructions 510.

The machine-readable storage medium 505 may be any electronic, magnetic, optical, or other physical storage device that stores the computer-executable instructions 510. Thus, the machine-readable storage medium 505 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 505 may include a non-transitory computer-readable storage medium. The machine-readable storage medium 505 may be encoded with executable instructions for enabling execution of remotely-hosted applications accessed on the remote communication device 515.

It should also be noted that features are not necessarily restricted only to any particular embodiments in the context of which those features are disclosed. For example, features disclosed in the context of a method may also or instead be implemented in apparatus and/or processor-readable medium embodiments.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A method for handling packet flows between a first network security zone and a second network security zone in a communications network, the method comprising:
   receiving, at a first logical side of a security control point in the communications network, a first packet that is part of a first unidirectional packet flow from the first network security zone to the second network security zone;
   determining whether the first packet is from a packet flow that has been assigned to any one of a plurality of security application instances;
   processing the first packet by one of the plurality of security application instances;
   determining whether a first flow identifier for the processed first packet is in a first flow database;
   recording the first flow identifier for the processed first packet in the first flow database upon determining that the first flow identifier for the processed first packet is not in the first flow database; and
   recording in a second flow database (i) a second flow identifier for a return packet flow of the first unidirectional packet flow, and (ii) a first security application instance identifier of the security application instance that processed the first packet,
   wherein the first flow database comprises a post-flow database that is searched after the first packet has been processed by the security application instance, wherein determining whether the first flow identifier is in the first flow database occurs after processing by the security application instance, wherein recording in the second flow database occurs to process return packet flows, and wherein the plurality of security application instances maintain security state information across the first unidirectional packet flow and the return packet flow of the first unidirectional packet flow for detecting security violations.

2. The method of claim 1, further comprising forwarding the first packet to an assigned security application instance upon determining that the first unidirectional packet flow has been assigned for processing to one of the plurality of security application instances, or upon recording of a security application instance identifier for the security application instance to which the first unidirectional packet flow is assigned for processing in a third flow database.

3. The method of claim 1, further comprising discharging the first packet from a second logical side of the security control point in the communications network upon determining that the flow identifier of the first packet is in the first flow database.

4. The method of claim 1, wherein the following steps are disabled for a predetermined type of security application:
   the determining whether a first flow identifier for the processed first packet is in a first flow database;
   the recording the first flow identifier for the processed first packet in the first flow database upon determining that the first flow identifier for the processed first packet is not in the first flow database; and
   the recording in a second flow database (i) a second flow identifier for a return packet flow of the first unidirectional packet flow, and (ii) a first security application instance identifier of the security application instance that processed the first packet.

5. The method of claim 4, wherein the predetermined type of security application does not change the IP source and/or destination addresses of the first packet.

6. The method of claim 1, wherein the following steps are only performed for a predetermined range of IP source and/or IP destination addresses of the first packet:
   the determining whether a first flow identifier for the processed first packet is in a first flow database;
   the recording the first flow identifier for the processed first packet in the first flow database upon determining that the first flow identifier for the processed first packet is not in the first flow database; and
   the recording in a second flow database (i) a second flow identifier for a return packet flow of the first unidirectional packet flow, and (ii) a first security application instance identifier of the security application instance that processed the first packet.

7. The method of claim 2, further comprising:
   receiving, at a second logical side of the security control point in the communications network, a second packet that is part of a second unidirectional packet flow from the second network security zone to the first network security zone;
   determining whether the second packet is from a packet flow that has been assigned to any one of the plurality of security application instances;
   processing the second packet by one of the plurality of security application instances;
   determining whether a third flow identifier for the processed second packet is in a fourth flow database;
   recording the third flow identifier for the processed second packet in the fourth flow database upon determining that the third flow identifier for the processed second packet is not in the fourth flow database; and
   recording in the third flow database (i) a fourth flow identifier for a return packet flow of the second unidirectional packet flow, and (ii) a second security application instance identifier that processed the second packet.

8. The method of claim 7, further comprising forwarding the second packet to an assigned security application instance upon determining that the second unidirectional packet flow has been assigned for processing to one of the plurality of security application instances, or upon recording of a security application instance identifier for the security application instance to which the second unidirectional packet flow is assigned for processing in the third flow database.

9. The method of claim 7, further comprising discharging the second packet from the first logical side of the security control point in the communications network upon determining that the flow identifier of the second packet is in the fourth flow database.

10. The method of claim 1, further comprising running the plurality of security application instances on a combination of a first host machine and a second host machine, wherein the first host machine and the second host machine are remotely located from each other.

11. The method of claim 10, wherein the first host machine comprises a first load balancer and the second host machine comprises a second load balancer, wherein the first load balancer is to (i) assign the first packet to one of the security application instances running on the second host machine, and (ii) forward the first packet to the second load balancer, and wherein the second load balancer is to forward the first packet to the one of the security application instances running on the second host machine.

12. A non-transitory machine-readable storage medium comprising computer-executable instructions that when executed cause a processor of a computing device to:
  receive, at a first logical side of a security control point in the communications network, a first packet that is part of a first unidirectional packet flow from the first network security zone to the second network security zone;
  determine whether the first packet is from a packet flow that has been assigned to any one of a plurality of security application instances;
  process the first packet by one of the plurality of security application instances;
  determine whether a first flow identifier for the processed first packet is in a first flow database;
  record the first flow identifier for the processed first packet in the first flow database upon determining that the first flow identifier for the processed first packet is not in the first flow database; and
  record in a second flow database (i) a second flow identifier for a return packet flow of the first unidirectional packet flow, and (ii) a first security application instance identifier of the security application instance that processed the first packet,
  wherein the first flow database comprises a post-flow database that is searched after the first packet has been processed by the security application instance, wherein determining whether the first flow identifier is in the first flow database occurs after processing by the security application instance, wherein recording in the second flow database occurs to process return packet flows, and wherein the plurality of security application instances maintain security state information across the first unidirectional packet flow and the return packet flow of the first unidirectional packet flow for detecting security violations.

13. The non-transitory machine-readable storage medium of claim 12, wherein the instructions, when executed, further cause the processor to forward the first packet to an assigned security application instance upon determining that the first unidirectional packet flow has been assigned for processing to one of the plurality of security application instances, or upon recording of a security application instance identifier for the security application instance to which the first unidirectional packet flow is assigned for processing in a third flow database.

14. The non-transitory machine-readable storage medium of claim 12, wherein the instructions, when executed, further cause the processor to discharge the first packet from a second logical side of the security control point in the communications network upon determining that the flow identifier of the first packet is in the first flow database.

15. The non-transitory machine-readable storage medium of claim 12, wherein the instructions, when executed, further cause the processor to disable the following steps for a predetermined type of security application:
  the determining whether a first flow identifier for the processed first packet is in a first flow database;
  the recording the first flow identifier for the processed first packet in the first flow database upon determining that the first flow identifier for the processed first packet is not in the first flow database; and
  the recording in a second flow database (i) a second flow identifier for a return packet flow of the first unidirectional packet flow, and (ii) a first security application instance identifier of the security application instance that processed the first packet.

16. The non-transitory machine-readable storage medium of claim 12, wherein the instructions, when executed, further cause the processor to only perform the following steps for a predetermined range of IP source and/or IP destination addresses of the first packet:
  the determining whether a first flow identifier for the processed first packet is in a first flow database;
  the recording the first flow identifier for the processed first packet in the first flow database upon determining that the first flow identifier for the processed first packet is not in the first flow database; and
  the recording in a second flow database (i) a second flow identifier for a return packet flow of the first unidirectional packet flow, and (ii) a first security application instance identifier of the security application instance that processed the first packet.

17. The non-transitory machine-readable storage medium of claim 13, wherein the instructions, when executed, further cause the processor to:
  receive, at a second logical side of the security control point in the communications network, a second packet that is part of a second unidirectional packet flow from the second network security zone to the first network security zone;
  determine whether the second packet is from a packet flow that has been assigned to any one of the plurality of security application instances;
  process the second packet by one of the plurality of security application instances;
  determine whether a third flow identifier for the processed second packet is in a fourth flow database;
  record the third flow identifier for the processed second packet in the fourth flow database upon determining that the third flow identifier for the processed second packet is not in the fourth flow database; and
  record in the third flow database (i) a fourth flow identifier for a return packet flow of the second unidirectional packet flow, and (ii) a second security application instance identifier that processed the second packet.

18. The non-transitory machine-readable storage medium of claim 17, wherein the instructions, when executed, further cause the processor to forward the second packet to an assigned security application instance upon determining that the second unidirectional packet flow has been assigned for processing to one of the plurality of security application instances, or upon recording of a security application instance identifier for the security application instances to which the second unidirectional packet flow is assigned for processing in the third flow database.

19. The non-transitory machine-readable storage medium of claim 17, wherein the instructions, when executed, further cause the processor to discharge the second packet from the first logical side of the security control point in the communications network upon determining that the flow identifier of the second packet is in the fourth flow database.

20. The non-transitory machine-readable storage medium of claim 12, wherein the instructions, when executed, further cause the processor to run the plurality of security application instances on a combination of a first host machine and a second host machine, wherein the first host machine and the second host machine are remotely located from each other.

21. The non-transitory machine-readable storage medium of claim 20, wherein the first host machine comprises a first load balancer and the second host machine comprises a second load balancer, and wherein the instructions, when executed, further cause the processor to:
    instruct the first load balancer to (i) assign the first packet to one of the security application instances running on the second host machine, and (ii) forward the first packet to the second load balancer, and
    instruct the second load balancer to forward the first packet to the one of the security application instances running on the second host machine.

22. A non-transitory machine-readable storage medium comprising computer-executable instructions that when executed cause a processor of a computing device to:
    receive packets that are part of a bidirectional packet flow between a pair of network security zones in a communications network;
    determine, based on relative loading of a plurality of identical instances of a security application running on a host machine, one instance of the plurality of identical instances of the security application to which to assign the bidirectional packet flow for security processing;
    direct all of the received packets that are part of the bidirectional packet flow for processing on the host machine by one of the security application instances; and
    search for a flow identifier of a received packet in multiple flow databases after the received packet undergoes security processing,
    wherein the multiple flow databases include post-flow databases that are searched after security processing to enable stateful processing of bidirectional packet flows, and wherein the security application maintains security state information across both directions of the bidirectional packet flow for detecting security violations.

* * * * *